(12) United States Patent
Suzuki (10) Patent No.: US 11,982,307 B2
(45) Date of Patent: May 14, 2024

(54) METHOD FOR JOINING PLATED STEEL SHEET AND JOINT STRUCTURE

(71) Applicant: KOBE STEEL, LTD., Hyogo (JP)

(72) Inventor: Reiichi Suzuki, Kanagawa (JP)

(73) Assignee: KOBE STEEL, LTD., Hyogo (JP)

( * ) Notice: Subject to any disclaimer, the term of this patent is extended or adjusted under 35 U.S.C. 154(b) by 716 days.

(21) Appl. No.: 16/973,949

(22) PCT Filed: May 31, 2019

(86) PCT No.: PCT/JP2019/021870
§ 371 (c)(1),
(2) Date: Dec. 10, 2020

(87) PCT Pub. No.: WO2019/244605
PCT Pub. Date: Dec. 26, 2019

(65) Prior Publication Data
US 2021/0246924 A1    Aug. 12, 2021

(30) Foreign Application Priority Data

Jun. 22, 2018 (JP) ................................. 2018-118957

(51) Int. Cl.
*F16B 5/08* (2006.01)
*B23K 9/007* (2006.01)
*B23K 9/16* (2006.01)

(52) U.S. Cl.
CPC ................. *F16B 5/08* (2013.01); *B23K 9/007* (2013.01); *B23K 9/16* (2013.01)

(58) Field of Classification Search
CPC ........ B23K 11/20; B23K 11/34; B23K 9/007; B23K 9/02; B23K 9/025; B23K 9/16;
(Continued)

(56) References Cited

U.S. PATENT DOCUMENTS 2,274,631 A * 2/1942 Meredith ............. B23K 35/222
239/81
2,760,044 A * 8/1956 Mott ........................ B23K 9/23
219/60 R
(Continued)

FOREIGN PATENT DOCUMENTS

CN       102281985 A      12/2011
CN       107530830 A       1/2018
(Continued)

OTHER PUBLICATIONS

International Search Report issued in PCT/JP2019/021870; dated Jul. 16, 2019.
(Continued)

*Primary Examiner* — Daniel J Wiley
(74) *Attorney, Agent, or Firm* — Studebaker & Brackett PC (57) ABSTRACT

The present invention relates to a method for joining a plated steel sheet, in which at least one of a first steel sheet and a second steel sheet is a plated steel sheet, and the first and second steel sheets overlapped with each other are subjected to an arc spot welding. The method includes press-working the first steel sheet into a desired shape and at the same time forming a linear groove on an overlapping surface with the second steel sheet of the first steel sheet, overlapping the first and second steel sheets, and setting a welding torch with the groove as a target position, and performing the arc spot welding so as to overlap the groove when viewed from a direction perpendicular to the overlapping surface.

14 Claims, 8 Drawing Sheets

(58) Field of Classification Search
CPC .......... B21D 39/03; F16B 5/08; F16B 11/006; B62D 27/026
See application file for complete search history.

(56) References Cited

U.S. PATENT DOCUMENTS

| | | | | |
|---|---|---|---|---|
| 2,804,885 | A * | 9/1957 | Mott | B23K 9/23 138/171 |
| 3,578,939 | A * | 5/1971 | Green | B23K 9/164 219/72 |
| 4,682,002 | A | 7/1987 | Delle Piane et al. | |
| 4,818,629 | A * | 4/1989 | Jenstrom | B01J 19/02 428/614 |
| 4,916,284 | A | 4/1990 | Petrick | |
| 6,276,591 | B1 * | 8/2001 | Kawasaki | B23K 20/122 228/114.5 |
| 7,315,009 | B2 * | 1/2008 | Fujimoto | B23K 26/26 219/121.36 |
| 2005/0152741 | A1 * | 7/2005 | Fujimoto | B23K 26/28 219/121.64 |
| 2006/0175310 | A1 | 8/2006 | Fujimoto et al. | |
| 2011/0278266 | A1 | 11/2011 | Kobayashi et al. | |
| 2018/0117707 | A1 | 5/2018 | Fujiwara et al. | |
| 2019/0270156 | A1 | 9/2019 | Fujiwara et al. | |
| 2019/0358732 | A1 * | 11/2019 | Watanabe | B23K 26/22 |
| 2019/0368524 | A1 * | 12/2019 | Fujiwara | B23K 26/322 |
| 2022/0111458 | A1 * | 4/2022 | Suzuki | B23K 35/383 |

FOREIGN PATENT DOCUMENTS

| | | |
|---|---|---|
| FR | 2 600 923 A1 | 1/1988 |
| JP | H07-032180 A | 2/1995 |
| JP | H07-155974 A | 6/1995 |
| JP | H09-047873 A | 2/1997 |
| JP | H09-136161 A | 5/1997 |
| JP | 2000-246445 A | 9/2000 |
| JP | 2003-311453 A | 11/2003 |
| JP | 2003-334657 A | 11/2003 |
| JP | 2004-082214 A | 3/2004 |
| JP | 2005-144504 A | 6/2005 |
| JP | 2005-144537 A | 6/2005 |
| JP | 2005-297026 A | 10/2005 |
| JP | 2014-113641 A | 6/2014 |
| JP | 2015-003552 A | 1/2015 |
| JP | 2017-164781 A | 9/2017 |
| WO | 2016/163055 A1 | 10/2016 |
| WO | 2018/070364 A1 | 4/2018 |

OTHER PUBLICATIONS

Written Opinion issued in PCT/JP2019/021870; dated Jul. 16, 2019.
The extended European search report issued by the European Patent Office dated Jun. 23, 2021, which corresponds to European Patent Application No. 19823215.9-1002 and is related to U.S. Appl. No. 16/973,949.

* cited by examiner

METHOD FOR JOINING PLATED STEEL SHEET AND JOINT STRUCTURE

TECHNICAL FIELD

The present invention relates to a method for joining a plated steel sheet and a joint structure.

BACKGROUND ART

Commonly, a so-called arc spot welding method is known, in which a plurality of steel plates are stacked and consumable electrode type arc welding is performed on the steel plates for a certain period of time without moving positions of a welding torch and a welding wire to obtain a disc-shaped weld metal portion, thereby joining the steel sheets.

However, in the case where galvanizing is applied to a surface of a steel sheet for the purpose of corrosion protection, and arc heat is applied to an overlapping surface of the steel sheet, the plated zinc may gasify when the temperature of the zinc exceeds its boiling point. In this case, when the steel sheets are in close contact with each other, there is no escape space of the zinc gas. Therefore, the zinc gas enters a molten pool that is liquid iron, and pore defects called blowholes, pits, and pinholes occur.

Regarding this problem, in the case where a gap accidentally generates between the steel sheets, it is empirically known that the zinc gas escapes from the gap, so that the zinc gas does not enter the molten pool and the pore defects are greatly reduced.

However, in the welding process, it is technically difficult to actively provide a gap between the steel sheets, and this conflicts with another requirement such as increasing the assembly accuracy. Therefore, it has been difficult to apply the arc spot welding method to the galvanized steel sheet.

In order to deal with such a problem, joining methods described in Patent Literatures 1 to 4 have been proposed.

In Patent Literature 1, a groove formed by knurling or the like, which extends from a non-pressure contact portion toward a pressure contact side edge portion, is formed on an inner surface of an overlapping portion of two plated steel sheets, and the plated steel sheets are joined, so that a gas generated during the welding is released from the groove to the external space.

In Patent Literature 2, a portion to be welded of a galvanized steel sheet is extendedly deformed, and protruding deformation is formed toward a direction opposite to the other galvanized steel sheet, so that a closed gap is formed between the steel sheets. The portion to be welded on which the protruding deformation is formed is irradiated with laser beams to perform laser welding.

In Patent Literature 3, a galvanized steel sheet is supported without restraining an edge portion of a galvanized steel sheet on a laser radiation side. Then, only the galvanized steel sheet on the laser radiation side is melted at a restraint side position from a lap welding position to form a gap between the galvanized steel sheets, and lap welding is performed on the galvanized steel sheets.

In Patent Literature 4, among two members to be welded, a protrusion is formed by applying compression or shearing deformation to a part of an edge portion of one member, or a protrusion is formed by performing half-punching shearing on a part of a surface. Then, by bringing the two members into contact with each other via the protrusion, a gap for discharging the gas between the members is ensured, and arc welding is performed.

CITATION LIST

Patent Literature

Patent Literature 1: JP-A-2000-246445
Patent Literature 2: JP-A-2003-311453
Patent Literature 3: JP-A-H7-32180
Patent Literature 4: JP-A-2014-113641

SUMMARY OF INVENTION

Technical Problem

However, in Patent Literature 1, arc welding has a high heat input, and the gap is closed by thermal deformation during welding in fine grooves formed by a process such as knurling and embossing. It is thus difficult to smoothly discharge a large amount of zinc gas with high heat input. A special machining step such as knurling is required to form the groove. Particularly, in the case of high tensile strength steel, it may also be difficult to form a groove by knurling, which causes a decrease in work efficiency and an increase in cost.

In Patent Literatures 2 and 3, a gap continuous to the sheet end or a large gap cannot be ensured in thermal deformation caused by TIG, plasma arc, or laser heating. It is thus difficult to smoothly discharge a large amount of zinc gas. Prior to main welding, a special machining step for causing the galvanized steel sheet to thermally deform is required. Therefore, the production efficiency may be greatly reduced, and material deterioration and welding cracks due to the influence of heat may occur.

Also in Patent Literature 4, similarly to Patent Literatures 1 to 3, a special machining step for providing a protrusion in a member to be welded is required to ensure a gap between the steel sheets, and the work efficiency is reduced. Since the two members to be welded are brought into contact with each other at the protrusions having a point shape to ensure a gap for the gas escape, it is difficult to know an optimal welding position for the welding, particularly a welding position between the protrusions, and teaching is difficult in the case of welding with a welding robot. There is thus room for improvement. Since the protrusion is at the edge portion of the member to be welded and has a point shape, the edge portion of the member to be welded may be crushed by a restraining force caused by the clamp or the like during the welding, and there may not be enough space for the zinc gas to escape.

The present invention has been made in view of the problems described above. An object thereof is to provide a method for joining a plated steel sheet in which, when a plurality of steel sheets including at least one plated steel sheet are overlapped and welded, a groove from which a gas generated from a weld portion can be reliably discharged is provided without adding a special machining step to obtain a good joint structure having no pore defects, and it is possible to visually identify an optimum welding position for welding easily or teach a teaching point to a welding robot.

Solution to Problem

The present invention includes a configuration in the following (1).

(1) A method for joining a plated steel sheet, in which at least one of a first steel sheet and a second steel sheet is a plated steel sheet, and the first and second steel sheets overlapped with each other are subjected to an arc spot welding, the method including:
  a step of press-working the first steel sheet into a desired shape and at the same time forming a linear groove on an overlapping surface with the second steel sheet of the first steel sheet;
  a step of overlapping the first and second steel sheets; and
  a step of setting a welding torch with the groove as a target position, and performing the arc spot welding so as to overlap the groove w % ben viewed from a direction perpendicular to the overlapping surface.

The preferred embodiments of the present invention have configurations in the following (2) to (14).

(2) The method for joining a plated steel sheet according to the above (1), in which the groove is a first groove approximately parallel to an edge portion of the first steel sheet, and
  at least one weld bead is formed on the first groove.

(3) The method for joining a plated steel sheet according to the above (1), in which the groove is a plurality of second grooves that are approximately perpendicular to an edge portion of the first steel sheet and are arranged along the edge portion, and
  a weld bead is formed on each of the second grooves.

(4) The method for joining a plated steel sheet according to the above (1), in which the groove is a first groove approximately parallel to an edge portion of the first steel sheet and a plurality of second grooves that are approximately perpendicular to the edge portion of the first steel sheet and that are arranged along the edge portion,
  the first groove intersects with each of the second grooves, and
  a weld bead is formed on each of intersection points of the first groove and the second grooves.

(5) The method for joining a plated steel sheet according to any one of the above (1) to (4), in which the groove protrudes in a direction separated from the overlapping surface with the second steel sheet.

(6) The method for joining a plated steel sheet according to any one of the above (1) to (5), in which a welding wire is supplied in the arc spot welding.

(7) The method for joining a plated steel sheet according to any one of the above (1) to (6), in which the groove is a lock bead provided during the press working.

(8) The method for joining a plated steel sheet according to any one of the above (1) to (7), in which the groove has a depth of 0.2 to 1.0 mm.

(9) The method for joining a plated steel sheet according to any one of the above (1) to (8), in which a hole is formed at a welding spot of the steel sheet to be an upper sheet in the welding step.

(10) The method for joining a plated steel sheet according to any one of the above (1) to (9), in which the plated steel sheet is a galvanized steel sheet having a tensile strength of 980 MPa or more.

(11) The method for joining a first steel sheet according to any one of the above (1) to (9), in which the first steel sheet is a steel sheet for hot stamping.

(12) The method for joining a first steel sheet according to the above (11), in which the press working is hot stamping.

(13) The method for joining a first steel sheet according to any one of the above (1) to (12), in which in the welding step, a shielding gas is a mixed gas containing 80 vol % or less of an Ar gas with a remainder being a $CO_2$ gas, or 100 vol % of the $CO_2$ gas.

(14) The method for joining a plated steel sheet according to any one of the above (1) to (13), in which in the welding step, a welding wire is supplied by positive and negative feeding control and is transferred to a molten pool by using the surface tension of droplets during a short circuit.

The present invention has a configuration in the following (15).

(15) A joint structure in which at least one of a first steel sheet and a second steel sheet is a plated steel sheet, and the first and second steel sheets overlapped with each other are arc-spot-welded, in which a liner groove formed by press working is formed on an overlapping surface with the second steel sheet of the first steel sheet, and
  a weld bead is formed so as to overlap at least a part of the groove when viewed from a direction perpendicular to the overlapping surface.

Advantageous Effects of Invention

According to the method for joining a plated steel sheet of the present invention, it is possible to prevent pore defects such as blowholes, pits, and pinholes caused by a gas generated during welding of a plated steel sheet, without adding a special machining step, and to obtain a joint structure having no pore defects and having excellent joining strength and high assembly accuracy after welding. It is possible to visually identify an optimum welding position for welding easily or teach a teaching point to a welding robot.

DESCRIPTION OF EMBODIMENTS

A method for joining a plated steel sheet according to each embodiment of the present invention and a joint structure formed by the joining method is described in detail with reference to the drawings.

First Embodiment

Figure 1A:
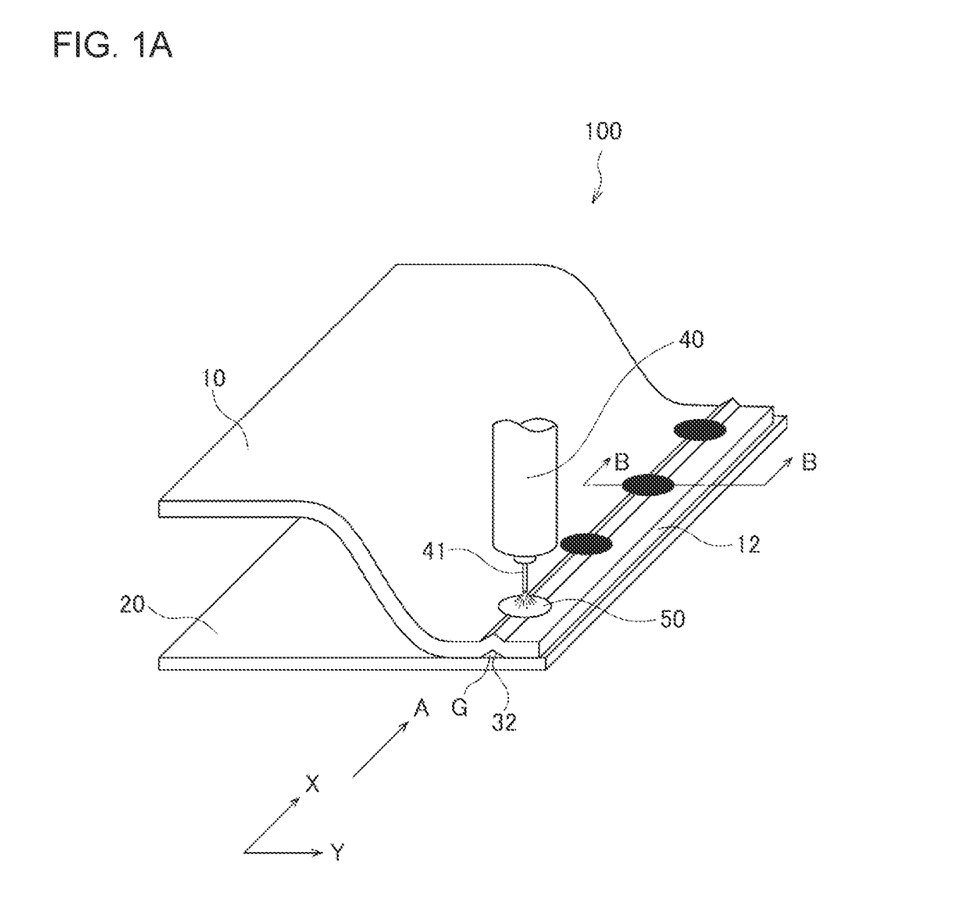
FIG. 1A is a perspective view schematically showing a method for joining a plated steel sheet according to a first embodiment of the present invention.
Figure 1B:
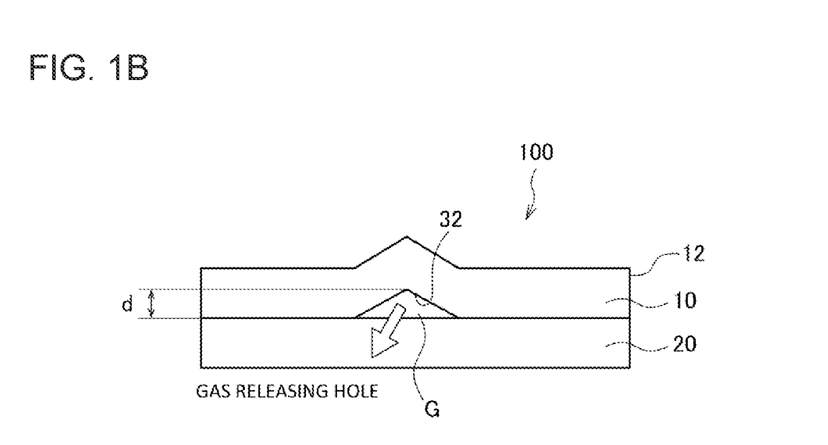
FIG. 1B is a side view, as viewed from an arrow A. of FIG. 1A.
Figure 1C:
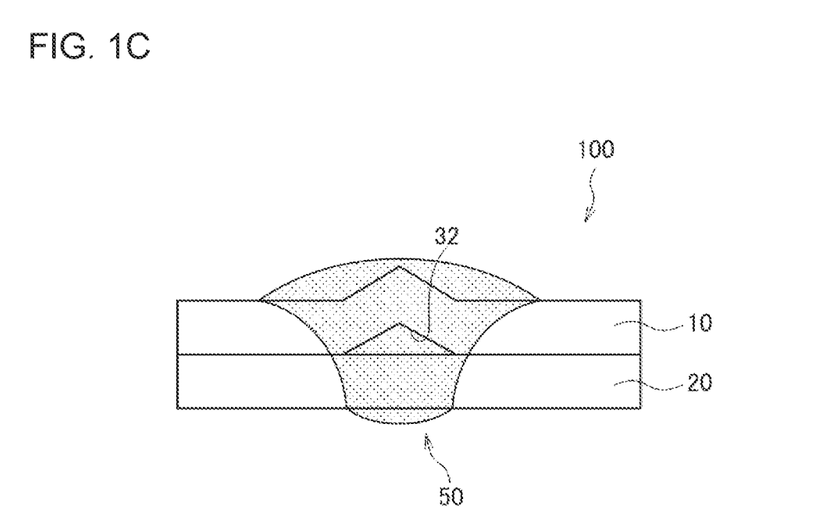
FIG. 1C is a B-B sectional view of FIG. 1A.

FIG. 1A is a perspective view schematically showing a method for joining a plated steel sheet according to a first embodiment of the present invention, and a joint structure formed by the joining method. FIG. 1B is a side view, as viewed from an arrow A, of FIG. 1A. FIG. 1C is a B-B sectional view of FIG. 1A.

As shown in FIG. 1A to FIG. 1C, a joint structure 100 is formed by arc-spot-welding a first steel sheet 10 and a second steel sheet 20, which are overlapped with each other, by a welding torch 40. At least one of the first steel sheet 10 and the second steel sheet 20 is a galvanized steel sheet on which galvanizing is performed. Examples of the galvanized steel sheet include a hot-dip galvannealed steel sheet (GA), a hot-dip galvanized steel sheet (GI), an electrogalvanized sheet steel (EG), and the like. The tensile strength (TS) of a galvanized steel sheet is not particularly limited, and for example, the galvanized steel sheet is high tensile strength steel (HTSS) having a tensile strength of 980 MPa or more, preferably 1180 MPa or more.

The galvanized steel sheet may be a single-sided plated steel sheet or a double-sided plated steel sheet formed by dipping (immersing) a steel plate in a treatment bath. In this embodiment, the galvanizing is applied to at least one of a surface of the first steel sheet 10 which faces the second steel sheet 20, and a surface of the second steel sheet 20 which faces the first steel sheet 10.

On the first steel sheet 10, an approximately inverted V-shaped first groove 32, which extends in a direction (hereinafter, also referred to as "X direction") along an edge portion 12 of the first steel sheet 10, and protrudes in a direction separated from an overlapping surface with the second steel sheet 20 (upward in FIG. 1A to FIG. 1C), is formed. The first groove 32 is formed at the same time as the first steel sheet 10 is pressed into a desired shape according to the use thereof.

In this way, the first groove 32 is formed at the same time as the forming processing (press working) of the first steel sheet 10 before a welding step of overlapping and welding the first steel sheet 10 and the second steel sheet 20. Therefore, a special machining step (dedicated step) for forming the first groove 32 is not required, which improves production efficiency and reduces manufacturing costs.

The first groove 32 has an approximately inverted V-shape in the first embodiment, but the shape is not particularly limited as long as the first groove 32 protrudes in a direction separated from the overlapping surface with the second steel sheet 20. For example, an inverted U-shape may also be employed.

Only one first groove 32 is provided in this embodiment, but a plurality of first grooves 32 may be provided substantially parallel to one another.

The timing of forming the first groove 32 may be when a blank material is punched out from the first steel sheet 10 or when the blank material is pressed into a product shape, and is not particularly limited. Thus, a special step for forming the first groove 32 is not required, which can improve production efficiency and reduce machining costs.

The first groove 32 may be replaced with a lock bead formed by a protruding portion (lock bead forming portion) provided in a mold (not shown) in order to prevent the flow of a metal material during press working.

The first steel sheet 10 may be a steel sheet for hot stamping, and in this case, the press working can be warm forming processing or hot forming processing (hot stamping). Thus, the first groove 32 can be easily formed by the press working even if the first steel sheet 10 is high tensile strength steel.

The joint structure 100 is formed by overlapping the first steel sheet 10 and the second steel sheet 20 with each other, performing arc spot welding on the first groove 32 in the X direction with an interval, and forming weld metal (weld bead) 50 at a weld portion to weld the first steel sheet 10 and the second steel sheet 20.

Next, a joining method for the joint structure 100 is described.

First, the first steel sheet 10, having an approximately inverted V-shaped first groove 32 formed along the edge portion 12 and protruding upward is formed by the press working, is overlapped with the second steel sheet 20. Then, the welding torch 40 is moved above the first groove 32 of the first steel sheet 10 with the first groove 32 as a target position (mark), and is set at a predetermined position.

Subsequently, a welding wire (filler wire or filler rod) 41, which is a consumable electrode, is fed from the welding torch 40, and an arc is generated between the welding torch 40 and the first steel sheet 10 and the second steel sheet 20 while a shielding gas flows, to perform arc spot welding at a position on the first groove 32. The first steel sheet 10 and the second steel sheet 20 are thus joined. Thus, the weld metal 50 is formed at a position on the first groove 32 as shown in FIG. 1C.

In this embodiment, the first groove 32 of the first steel sheet 10 protrudes in a direction separated from the overlapping surface with the second steel sheet 20, and the first steel sheet 10 and the second steel sheet 20 are overlapped with each other on planes having a large area. Therefore, a gap can be managed while maintaining the parallelism of lap joints, and the accuracy of a shape of a component after welding is improved.

The first groove 32 is a target position of the welding, so that a welding position can be visually checked, and the welding torch 40 can be accurately moved to the welding position. In the case of welding performed by a welding robot, a welding position can be easily taught.

The welding position may be one position on the first groove 32 or may be a plurality of welding positions along the first groove 32 extending in the X direction. When the spot welding is performed at the plurality of welding positions, a welding interval can be optionally set in accordance with the required joining strength.

As the shielding gas, a mixed gas containing 80 vol % or less of an Ar gas with a reminder being a $CO_2$, or 100 vol % of the $CO_2$ gas is preferred. The $CO_2$ gas has an effect of throttling an arc and is suitable for the welding of a joint having a large plate thickness, which requires a welding depth.

In the welding of a galvanized steel sheet, the galvanized steel sheet is heated by the arc spot welding, and thus, zinc having a boiling point of about 900° C. evaporates and enters a molten pool, and pore defects such as blowholes, pits, and pinholes may occur in a weld portion.

However, according to the joining method in this embodiment, a gap G formed by the first groove 32 of the first steel sheet 10 serves as a gas releasing hole, so that the generated zinc gas is discharged in the X direction from the gap G, and occurrence of the pore defects can be prevented. Since the first groove 32 is formed by the press working, the gap G having a size sufficient to discharge a zinc gas can be ensured between the first steel sheet 10 and the second steel sheet 20.

The gap G may be large enough to discharge the generated zinc gas. In order to obtain the effect of this embodiment, the depth d (see FIG. 1B) of the first groove 32 is preferably 0.2 to 1.0 mm. In the case where the depth d of the first groove 32 is less than 0.2 mm as in general knurling, the gap G may be easily closed due to thermal deformation during the welding, and the discharge of the zinc gas may be insufficient. In the case where the depth d of the first groove portion 32 exceeds 1.0 mm, the gap G between the first steel sheet 10 and the second steel sheet 20 may become larger and the joining strength may decrease.

The welding wire 41 is preferably supplied by positive and negative feeding control. Thus, droplets are transferred to the molten pool by using the surface tension of the droplets during a short circuit, and thus, the heat input to the first steel sheet 10 and the second steel sheet 20 can be reduced, and the amount of evaporation of zinc can be reduced.

In the method for joining the plated steel sheet of this embodiment, the arc spot welding is performed while the welding wire 41 is fed. Therefore, as shown in FIG. 1C, the gap G formed by the first groove 32 is filled with the weld metal 50. Thus, the joining strength between the first steel sheet 10 and the second steel sheet 20 can be sufficiently ensured.

A hole may be provided in the welding place of the first steel sheet 10 in advance. Thus, heating can be performed from a contact portion between the first steel sheet 10 and the second steel sheet 20, not from the top of the first steel sheet 10, and the joining strength is improved.

In the case of a galvanized steel sheet using high tensile strength steel, a grain boundary embrittlement crack called liquid metal embrittlement crack (LME crack) is likely to occur in the resistance spot welding in which very high pressure is applied. However, in the joining method based on arc welding in this embodiment, the LME crack does not occur in principle and pore defects can also be prevented since the pressing force is extremely small. Rapid solidification is not performed like the resistance spot welding, so that excessive heat-affected zone hardness is not exhibited, and the sensitivity to delayed cracking due to hydrogen can also be reduced.

Second Embodiment

Figure 2A:
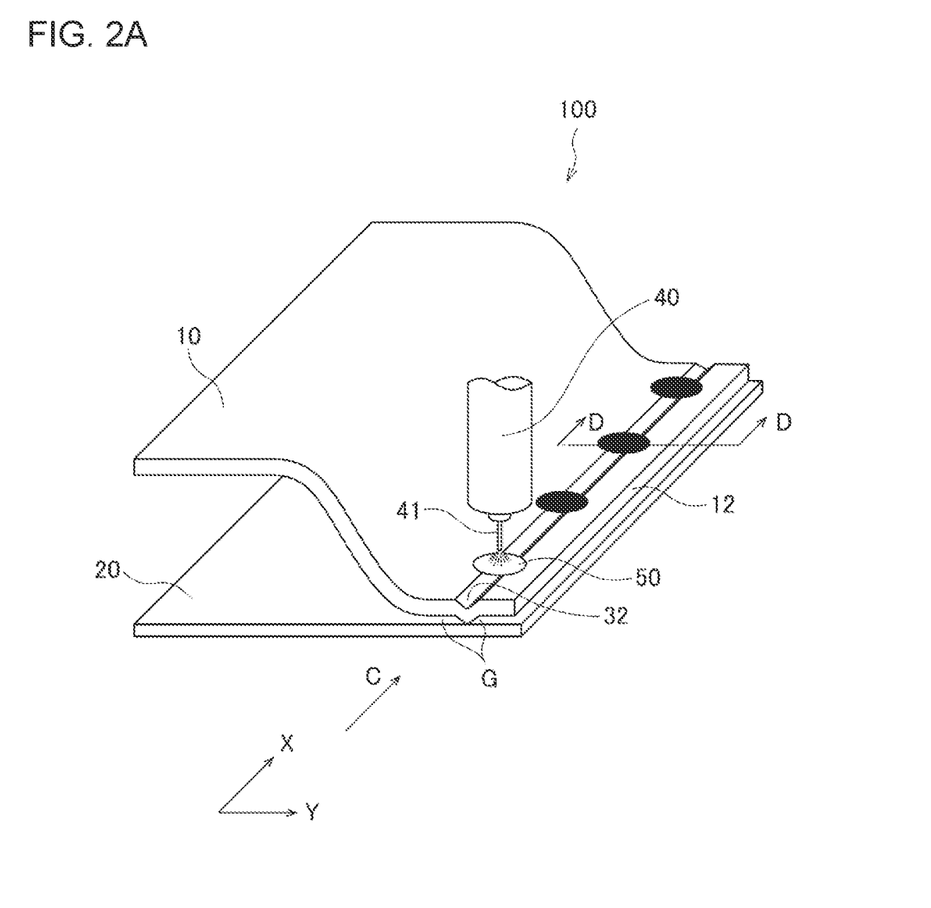
FIG. 2A is a perspective view schematically showing a method for joining a plated steel sheet according to a second embodiment of the present invention.
Figure 2B:
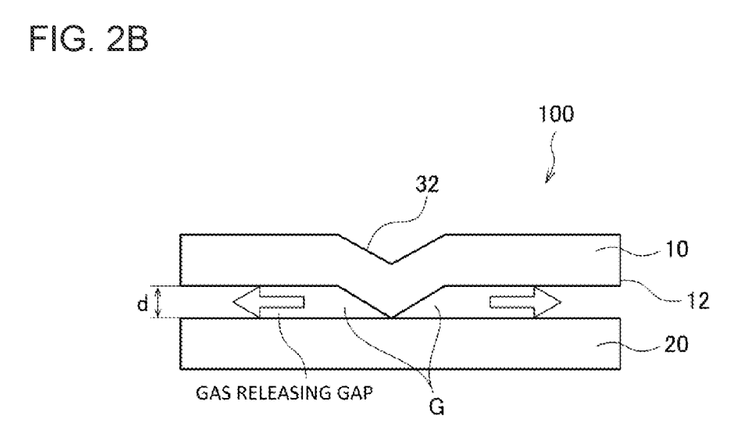
FIG. 2B is a side view, as viewed from an arrow C. of FIG. 2A.
Figure 2C:
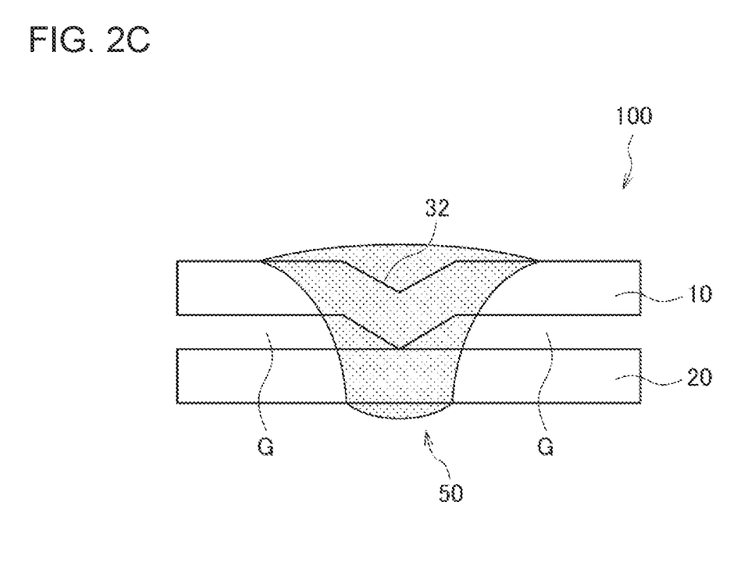
FIG. 2C is a D-D sectional view of FIG. 2A.

FIG. 2A is a perspective view schematically showing a method for joining a plated steel sheet according to a second embodiment of the present invention, and a joint structure formed by the joining method. FIG. 2B is a side view, as viewed from an arrow C, of FIG. 2A. FIG. 2C is a D-D sectional view of FIG. 2A.

In the joint structure 100 of this embodiment, an approximately V-shaped first groove 32, which extends in a direction (X direction) along the edge portion 12 of the first steel sheet 10 and which protrudes in a direction toward the overlapping surface with the second steel sheet 20 (downward in FIG. 2A to FIG. 2C), is formed on the first steel sheet 10 overlapped with the second steel sheet 20. Similar to the first steel sheet 10 of the first embodiment, the first groove 32 is formed at the same time as the first steel sheet 10 is pressed into a desired shape.

Other parts are the same as those of the joint structure 100 according to the first embodiment, and the joining method thereof is also the same.

The approximately V-shaped first groove 32 protruding downward toward the second steel sheet 20 is formed on the first steel sheet 10, so that the gaps G are formed on both sides of the first groove 32 (hereinafter, also referred to as "Y direction") between the first steel sheet 10 and the second steel sheet 20 when the first steel sheet 10 is overlapped with the second steel sheet 20. The gaps G each have a height of 0.2 to 1.0 mm, which is the same as the depth d (see FIG. 2B) of the first groove 32.

Then, the zinc gas generated when the first steel sheet 10 and the second steel sheet 20 are subjected to the arc spot welding is discharged in the Y direction from the gaps G formed on both sides of the first groove 32 in the Y direction, so that the pore defects that occur at the weld portion are prevented.

In this embodiment, the first groove 32 of the first steel sheet 10 protrudes in the direction toward the overlapping surface with the second steel sheet 20, so that the gaps G having a size sufficient to discharge a zinc gas can be reliably ensured.

Third Embodiment

Figure 3:
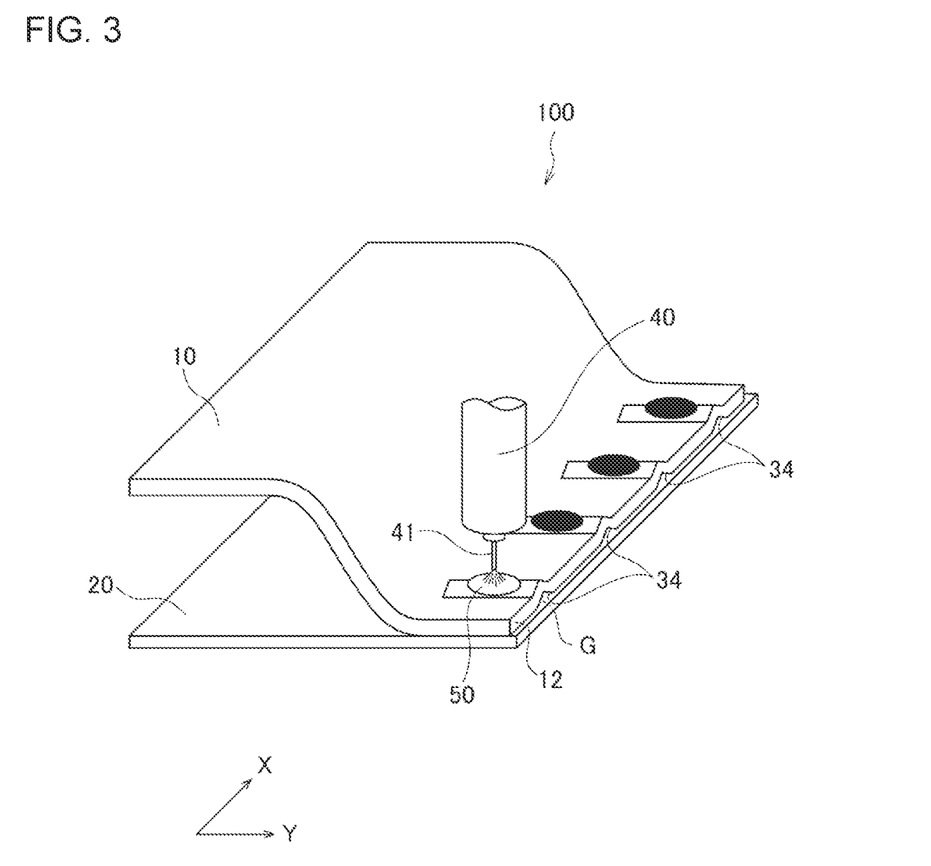
FIG. 3 is a perspective view schematically showing a method for joining a plated steel sheet according to a third embodiment of the present invention.

FIG. 3 is a perspective view schematically showing a method for joining a plated steel sheet according to a third embodiment of the present invention, and a joint structure formed by the joining method.

In the joint structure 100 of this embodiment, a plurality of approximately inverted V-shaped second grooves 34, which extend in a direction (Y direction) that is approximately perpendicular to the edge portion 12 of the first steel sheet 10, are arranged along the edge portion 12, and protrude upward, are formed on the first steel sheet 10 overlapped with the second steel sheet 20.

Other parts are the same as those of the joint structure 100 according to the first embodiment, and the joining method thereof is also the same.

The plurality of approximately inverted V-shaped second grooves 34, which extend in the direction that is approximately perpendicular to the edge portion 12 of the first steel sheet 10, and are arranged along the edge portion 12, are formed, so that the arc spot welding can be easily performed on the second groove 34 with the second groove 34 as a target position (mark). At this time, the zinc gas is discharged in the Y direction via the gaps G defined by the approximately inverted V-shaped second grooves 34 and the second steel sheet 20, so that the pore defects that occur at the weld portion are prevented. Since welding is performed on the second grooves 34, the welding interval can be easily adjusted to the interval between the second grooves 34.

Similar to the first embodiment, the second grooves 34 of the first steel sheet 10 protrude in a direction separated from the overlapping surface with the second steel sheet 20, and the first steel sheet 10 and the second steel sheet 20 are overlapped with each other on planes having a large area. Therefore, a gap can be managed while maintaining the parallelism of lap joints, and the accuracy of a shape of a component after welding is improved.

Fourth Embodiment

Figure 4:
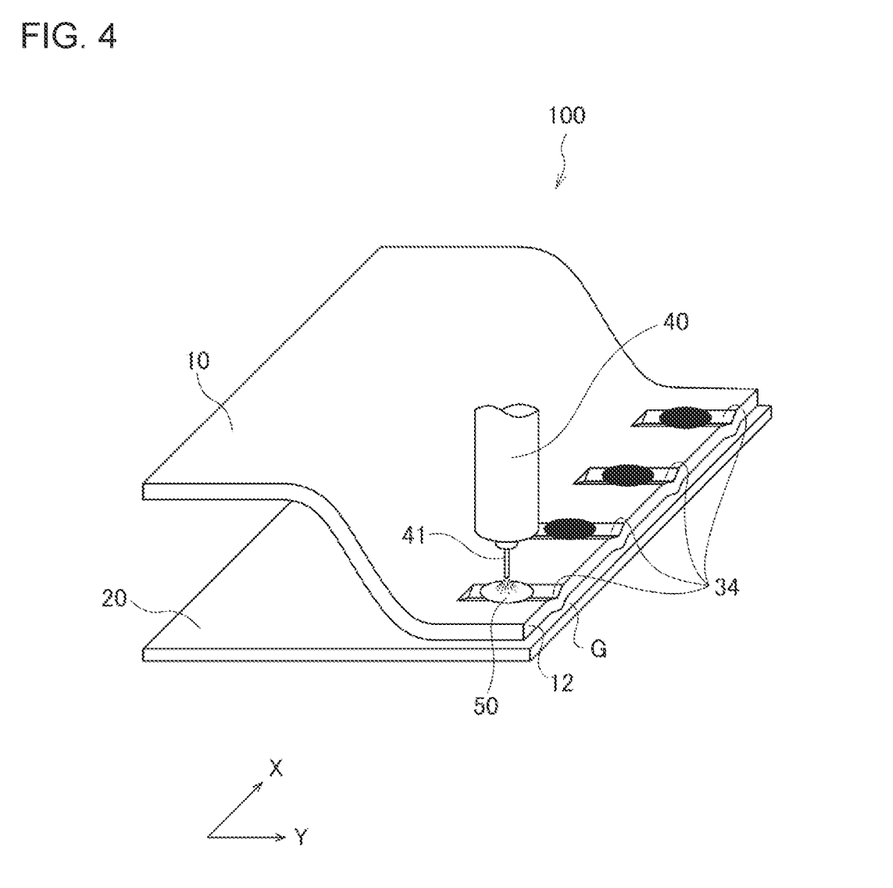
FIG. 4 is a perspective view schematically showing a method for joining a plated steel sheet according to a fourth embodiment of the present invention.

FIG. 4 is a perspective view schematically showing a method for joining a plated steel sheet according to a fourth embodiment of the present invention, and a joint structure formed by the joining method.

In the joint structure 100 of this embodiment, a plurality of approximately V-shaped second grooves 34, which extend in a direction that is approximately perpendicular to the edge portion 12 of the first steel sheet 10, are arranged along the edge portion 12, and protrude downward, are formed on the first steel sheet 10.

Other parts are the same as those of the joint structure 100 according to the third embodiment, and the joining method thereof is also the same.

The plurality of approximately V-shaped second grooves 34, which extend in the direction that is approximately perpendicular to the edge portion 12 of the first steel sheet 10, are arranged along the edge portion 12, and protrude downward, are formed, so that the zinc gas is discharged via the gaps G, which are formed on both sides of the second groove 34 in the X direction by the plurality of approximately V-shaped second grooves 34, to prevent the pore defects that occur at the weld portion.

Similar to the second embodiment, the second grooves 34 of the first steel sheet 10 protrude in the direction toward the overlapping surface with the second steel sheet 20, so that the gaps G having a size sufficient to discharge a zinc gas can be reliably ensured.

Fifth Embodiment

Figure 5:
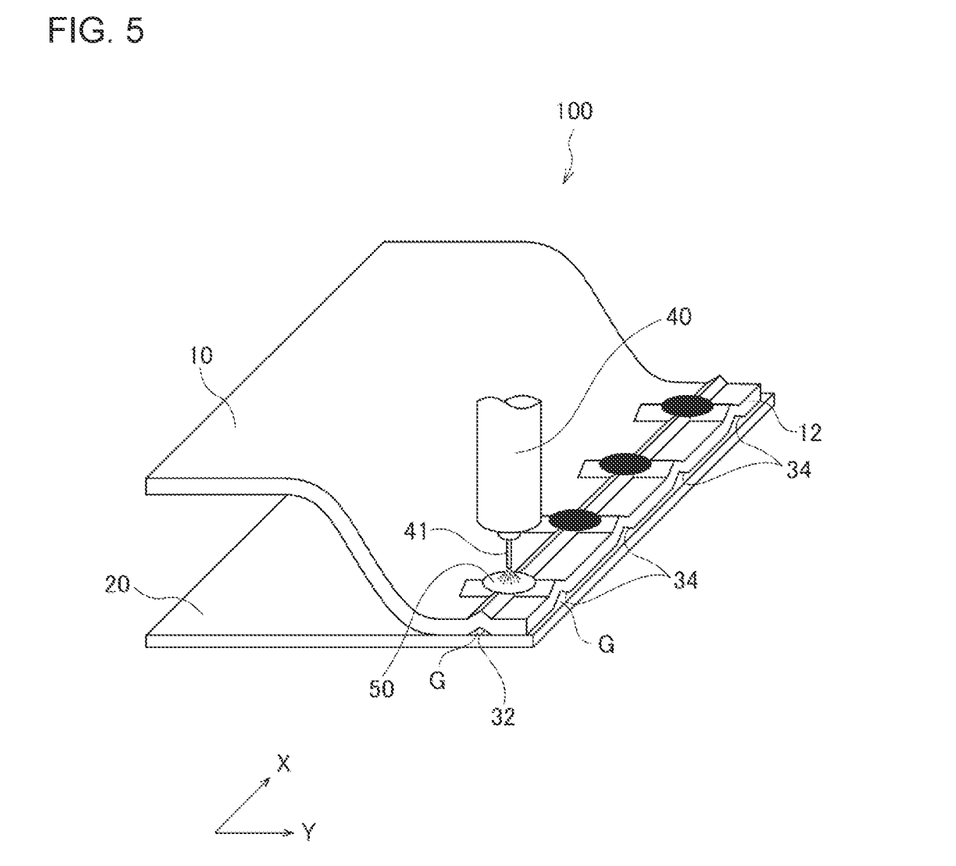
FIG. 5 is a perspective view schematically showing a method for joining a plated steel sheet according to a fifth embodiment of the present invention.

FIG. 5 is a perspective view schematically showing a method for joining a plated steel sheet according to a fifth embodiment of the present invention, and a joint structure formed by the joining method.

In the joint structure 100 of this embodiment, the approximately inverted V-shaped first groove 32, which extends in a direction (X direction) along the edge portion 12 of the first steel sheet 10 and protrudes upward, and a plurality of approximately inverted V-shaped second grooves 34, which are approximately perpendicular (in the Y direction) to the edge portion 12 of the first steel sheet 10, are arranged along the edge portion 12, and protrude upward, intersect with each other and are formed on the first steel sheet 10 overlapped with the second steel sheet 20. A position of the arc spot welding performed by the welding torch 40 is set on an intersection point of the first groove 32 and the second grooves 34.

Other parts are the same as those of the joint structures 100 according to the first embodiment and the third embodiment, and the joining method thereof is also the same.

The first groove 32 and the second grooves 34 intersect with each other and are formed on the first steel sheet 10, and arc spot welding is performed on the intersection point of the first groove 32 and the second grooves 34, so that the welding torch 40 can be easily positioned and the welding interval can be kept constant.

The first groove 32 and the second grooves 34 can be formed in separate steps, but it is preferable to form the first groove 32 and the second grooves 34 at the same time from the viewpoint of work efficiency. When the first groove 32 and the second grooves 34 are formed in separate steps, the first groove 32 is formed into an approximately inverted V-shape, and the second grooves 34 may be formed into an approximately V-shape or vice versa.

Similar to the first embodiment and the third embodiment, the first groove 32 and the second grooves 34 of the first steel sheet 10 protrude in a direction separated from the overlapping surface with the second steel sheet 20, and the first steel sheet 10 and the second steel sheet 20 are overlapped with each other on planes having a large area. Therefore, a gap can be managed while maintaining the parallelism of lap joints, and the accuracy of a shape of a component after welding is improved.

Sixth Embodiment

Figure 6:
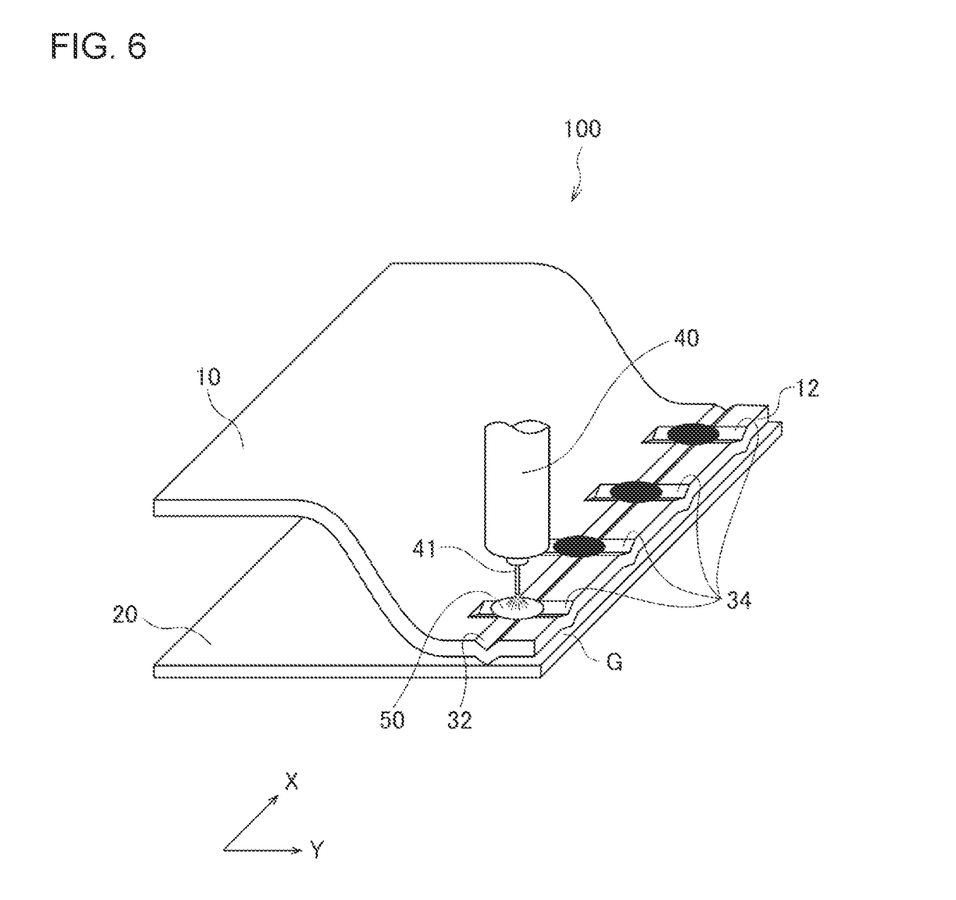
FIG. 6 is a perspective view schematically showing a method for joining a plated steel sheet according to a sixth embodiment of the present invention.

FIG. 6 is a perspective view schematically showing a method for joining a plated steel sheet according to a sixth embodiment of the present invention, and a joint structure formed by the joining method.

In the joint structure 100 of this embodiment, the approximately V-shaped first groove 32, which extends in a direction (X direction) along the edge portion 12 of the first steel sheet 10 and protrudes downward toward the second steel sheet 20, and a plurality of approximately V-shaped second grooves 34, which are approximately perpendicular (in the Y direction) to the edge portion 12 of the first steel sheet 10, are arranged along the edge portion 12, and protrude downward, intersect with each other and are formed on the first steel sheet 10 overlapped with the second steel sheet 20. A position of the arc spot welding performed by the welding torch 40 is set on an intersection point of the first groove 32 and the second grooves 34.

Other parts are the same as those of the joint structures 100 according to the second embodiment and the fourth embodiment, and the joining method thereof is also the same.

The first groove 32 and the second grooves 34 intersect with each other and are formed on the first steel sheet 10, and arc spot welding is performed on the intersection point of the first groove 32 and the second grooves 34, so that the welding torch 40 can be easily positioned and the welding interval can be kept constant while the generated zinc gas is discharged.

Similar to the second embodiment and the fourth embodiment, the first groove 32 and the second grooves 34 of the first steel sheet 10 protrude in the direction toward the overlapping surface with the second steel sheet 20, so that the gaps G having a size sufficient to discharge a zinc gas can be reliably ensured.

The present invention is not limited to the embodiments described above, and modifications, improvements, or the like can be made as appropriate. The effect of preventing the pore defects in the present invention is an effect obtained by discharging the zinc gas generated by the arc spot welding from the gaps between the first steel sheet 10 and the second steel sheet 20. Therefore, in the most common welding in arc welding, in which beads are formed linearly in an edge portion of a plate (for example, the edge portion 12 of the first steel sheet in FIG. 1A), the discharge of the zinc gas cannot be performed, and the same effect as that of the present invention cannot be expected.

As described above, the present description discloses the following matters.

(1) A method for joining a plated steel sheet, in which at least one of a first steel sheet and a second steel sheet is a plated steel sheet, and the first and second steel sheets overlapped with each other are subjected to an arc spot welding, the method including:
  a step of press-working the first steel sheet into a desired shape and at the same time forming a linear groove on an overlapping surface with the second steel sheet of the first steel sheet;
  a step of overlapping the first and second steel sheets; and a step of setting a welding torch with the groove as a target position, and performing the arc spot welding so as to overlap the groove when viewed from a direction perpendicular to the overlapping surface.

According to this configuration, the gas, which is generated by heating the plated steel sheet by arc spot welding, can be discharged from a gap formed on the first groove of the first steel sheet, and the occurrence of pore defects can be prevented. A special machining step for forming the first groove is not required, which can improve production efficiency and reduce machining costs. The first groove is a target position, so that a welding position can be visually checked, and the welding torch can be accurately moved to the welding position. In the case of using a welding robot, the teaching of the welding position is easy.

(2) The method for joining a plated steel sheet according to the above (1), in which the groove is a first groove approximately parallel to an edge portion of the first steel sheet, and at least one weld bead is formed on the first groove.

According to this configuration, a gap is formed on the overlapping surface to be overlapped with the second steel sheet by the first groove, and a zinc gas generated during the arc spot welding is discharged from the gap, so that the pore defects that occur at the weld portion can be prevented.

(3) The method for joining a plated steel sheet according to the above (1), in which the groove is a plurality of second grooves that are approximately perpendicular to an edge portion of the first steel sheet and are arranged along the edge portion, and a weld bead is formed on each of the second grooves.

According to this configuration, the zinc gas can be discharged via gaps defined by the second grooves and an upper surface of the second steel sheet when the arc spot welding is performed, and the pore defects in the weld portion can be prevented. Since welding is performed on the second grooves, the welding interval can be easily adjusted to an interval between the second grooves.

(4) The method for joining a plated steel sheet according to the above (1), in which the groove is a first groove approximately parallel to an edge portion of the first steel sheet and a plurality of second grooves that are approximately perpendicular to the edge portion of the first steel sheet and that are arranged along the edge portion, the first groove intersects with each of the second grooves, and a weld bead is formed on each of intersection points of the first groove and the second grooves.

According to this configuration, the zinc gas generated during the arc spot welding can be reliably ensured. A welding torch can be easily positioned and a welding interval can be kept constant.

(5) The method for joining a plated steel sheet according to any one of the above (1) to (4), in which the groove protrudes in a direction separated from the overlapping surface with the second steel sheet.

According to this configuration, the first steel sheet and the second steel sheet are overlapped in parallel on planes having a large area, so that a gap can be managed while maintaining parallelism of lap joints, and the accuracy of a shape of a component after welding is improved.

(6) The method for joining a plated steel sheet according to any one of the above (1) to (5), in which a welding wire is supplied in the arc spot welding.

According to this configuration, when the first steel sheet is overlapped with the second steel sheet, a gap formed between the first steel sheet and the second steel sheet, which is formed by the groove of the first steel sheet, can be filled with a weld metal, and the joining strength is improved.

(7) The method for joining a plated steel sheet according to any one of the above (1) to (6), in which the groove is a lock bead provided during the press working.

According to this configuration, a special machining step for forming the first groove is not required, which can improve production efficiency and reduce machining costs.

(8) The method for joining a plated steel sheet according to any one of the above (1) to (7), in which the groove has a depth of 0.2 to 1.0 mm.

According to this configuration, a gas generated during welding can be reliably discharged without reducing the joining strength and the assembly accuracy.

(9) The method for joining a plated steel sheet according to any one of the above (1) to (8), in which a hole is formed at a welding spot of the steel sheet to be an upper sheet in the welding step.

According to this configuration, welding can be performed from insides of the first and second steel sheets overlapped with each other, and the joining strength is improved.

(10) The method for joining a plated steel sheet according to any one of the above (1) to (9), in which the plated steel sheet is a galvanized steel sheet having a tensile strength of 980 MPa or more.

According to this configuration, the arc spot welding of a galvanized steel sheet, which is high tensile strength steel, is possible.

(11) The method for joining a first steel sheet according to any one of the above (1) to (9), in which the first steel sheet is a steel sheet for hot stamping.

According to this configuration, arc spot welding of high tensile strength steel is possible.

(12) The method for joining a first steel sheet according to the above (11), in which the press working is hot stamping.

According to this configuration, the first groove can be easily formed by the press working even if the first steel sheet is high tensile strength steel.

(13) The method for joining a first steel sheet according to any one of the above (1) to (12), wherein in the welding step, a shielding gas is a mixed gas containing 80 vol % or less of an Ar gas with a remainder being a $CO_2$ gas, or 100 vol % of the $CO_2$ gas.

According to this configuration, the arc can be throttled by the $CO_2$ gas, and the welding with a large welding depth can be performed.

(14) The method for joining a plated steel sheet according to any one of the above (1) to (13), in which in the welding step, a welding wire is supplied by positive and negative feeding control and is transferred to a molten pool by using the surface tension of droplets during a short circuit.

According to this configuration, droplets are transferred to the molten pool by using the surface tension of the droplets during a short circuit, and thus, the heat input to the first and second steel sheets can be reduced, and the amount of evaporation of zinc can be reduced.

(15) A joint structure in which at least one of a first steel sheet and a second steel sheet is a plated steel sheet, and the first and second steel sheets overlapped with each other are arc-spot-welded, in which a liner groove formed by press working is formed on an overlapping surface with the second steel sheet of the first steel sheet, and a weld bead is formed so as to overlap at least a part of the groove when viewed from a direction perpendicular to the overlapping surface.

According to this configuration, a joint structure having no pore defects, and having excellent joining strength and high assembly accuracy after welding can be obtained.

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

This application is based on a Japanese patent application (Japanese Patent Application No. 2018-118957) filed on Jun. 22, 2018, contents of which are incorporated herein by reference.

REFERENCE SIGNS LIST

10 First steel sheet
12 Edge portion of first steel sheet (edge portion)
20 Second steel sheet
32 First groove (groove)
34 Second groove (groove)
40 Welding torch
41 Welding wire
50 Weld metal (weld bead)
100 Joint structure
G Gap
d Depth of first groove

The invention claimed is:

1. A method for joining a plated steel sheet, in which at least one of a first steel sheet and a second steel sheet is a plated steel sheet, the first steel sheet having a first surface and a second surface, and the first and second steel sheets overlapped with each other in such a manner that the second surface of the first steel sheet facing the second steel sheet are subjected to an arc spot welding, the method comprising:
    press-working the first steel sheet into a desired shape and at the same time forming a linear groove on at least one of the first surface and the second surface of the first steel sheet corresponding to an overlapping part with the second steel sheet;
    overlapping the first and second steel sheets; and
    placing a welding torch directly over the first surface of the first steel sheet with the groove as a target position, and performing the arc spot welding so as to overlap the groove when viewed from a direction perpendicular to the overlapping surface.

2. The method for joining a plated steel sheet according to claim 1,
    wherein the groove is a first groove approximately parallel to an edge portion of the first steel sheet, and
    at least one weld bead is formed on the first groove.

3. The method for joining a plated steel sheet according to claim 1,
    wherein the groove is a plurality of second grooves that are approximately perpendicular to an edge portion of the first steel sheet and are arranged along the edge portion, and
    a weld bead is formed on each of the second grooves.

4. The method for joining a plated steel sheet according to claim 1,
    wherein the groove is a first groove approximately parallel to an edge portion of the first steel sheet and a plurality of second grooves that are approximately perpendicular to the edge portion of the first steel sheet and that are arranged along the edge portion,
    the first groove intersects with each of the second grooves, and
    a weld bead is formed on each of intersection points of the first groove and the second grooves.

5. The method for joining a plated steel sheet according to claim 1, wherein the groove protrudes in a direction separated from the overlapping surface with the second steel sheet.

6. The method for joining a plated steel sheet according to claim 1, wherein a welding wire is supplied in the arc spot welding.

7. The method for joining a plated steel sheet according to claim 1, wherein the groove is a lock bead provided during the press working.

8. The method for joining a plated steel sheet according to claim 1, wherein the groove has a depth of 0.2 to 1.0 mm.

9. The method for joining a plated steel sheet according to claim 1, wherein a hole is formed at a welding spot of the steel sheet to be an upper sheet in the welding.

10. The method for joining a plated steel sheet according to claim 1, wherein the plated steel sheet is a galvanized steel sheet having a tensile strength of 980 MPa or more.

11. The method for joining a first steel sheet according to claim 1, wherein the first steel sheet is a steel sheet for hot stamping.

12. The method for joining a first steel sheet according to claim 1, wherein the press working is hot stamping.

13. The method for joining a first steel sheet according to claim 1, wherein in the welding, a shielding gas is a mixed gas containing 80 vol % or less of an Ar gas with a remainder being a $CO_2$ gas, or 100 vol % of the $CO_2$ gas.

14. The method for joining a plated steel sheet according to claim 1, wherein in the welding, a welding wire is supplied by positive and negative feeding control and is transferred to a molten pool by using the surface tension of droplets during a short circuit.

* * * * *